Figure 1:
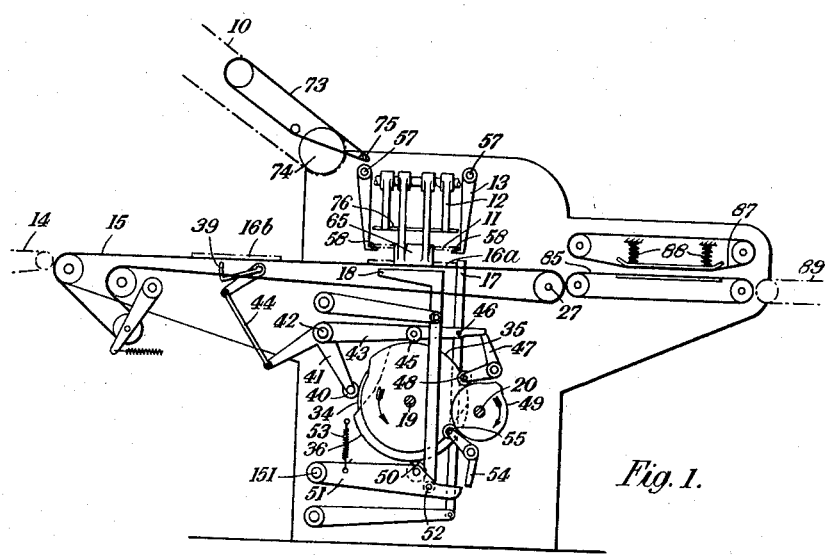

June 10, 1958  K. FARRER  2,838,010
SANDWICHING MACHINE
Filed March 27, 1956  7 Sheets-Sheet 1

INVENTOR
KENNETH FARRER
By Watson, Cole, Grindle & Watson
ATTORNEYS

June 10, 1958　　　K. FARRER　　　2,838,010
SANDWICHING MACHINE
Filed March 27, 1956　　　　　　　　7 Sheets-Sheet 3

INVENTOR
KENNETH FARRER
By Watson, Cole, Grindle & Watson
ATTORNEYS

June 10, 1958

K. FARRER 2,838,010

SANDWICHING MACHINE

Filed March 27, 1956

7 Sheets-Sheet 4

INVENTOR
KENNETH FARRER

By

Watson, Cole, Grindle & Watson
ATTORNEYS

June 10, 1958     K. FARRER     2,838,010
SANDWICHING MACHINE
Filed March 27, 1956     7 Sheets-Sheet 6

INVENTOR
KENNETH FARRER

United States Patent Office 2,838,010
Patented June 10, 1958

2,838,010

SANDWICHING MACHINE

Kenneth Farrer, Peterborough, Northants, England, assignor to Baker Perkins Limited, Peterborough, England, a company of Great Britain Application March 27, 1956, Serial No. 574,197

Claims priority, application Great Britain March 29, 1955

11 Claims. (Cl. 107—1)

This invention provides a sandwiching machine for producing sandwiches consisting of layers of wafer sheets, biscuits or the like (hereinafter for brevity referred to as wafer sheets) with intervening layers of cream or other filling material (hereinafter for brevity referred to as cream).

The invention provides a machine for producing wafer sandwiches comprising a conveyor for feeding creamed wafer sheets, with their creamed surfaces uppermost, successively into position against a stop, means for periodically lifting arrested wafer sheets from the conveyor and afterwards allowing the lifted wafer sheets to descend into position on top of another arrested wafer sheet, thereby forming a sandwich of superposed creamed wafer sheets in front of the stop, mechanism for incorporating at the top of each sandwich a single dry wafer sheet, and means for periodically withdrawing the stop to permit the conveyor to feed completed wafer sandwiches forward.

The invention includes a machine for producing wafer sandwiches, each consisting of a dry wafer sheet on top of $n$ creamed wafer sheets, $n$ being a small whole number, comprising a conveyor for feeding creamed wafer sheets, with their creamed surfaces uppermost, successively into position against a stop, a reciprocating table for periodically lifting the arrested wafer sheets from the conveyor and into the grip of support fingers, the table performing $n-1$ strokes per sandwich, means for periodically opening the support fingers to allow wafer sheets held thereby to fall on top of a wafer sheet arrested by the stop, means for introducing into the support fingers a single dry wafer sheet for incorporation in each sandwich, and means operating whenever a completed wafer sandwich has been formed to withdraw the stop and allow the conveyor to feed the wafer sandwich forward.

The invention also includes a machine for producing wafer sandwiches, comprising a conveyor for feeding creamed wafer sheets, with their creamed surfaces uppermost, into position against a stop, a reciprocating table for periodically lifting the arrested wafer sheets from the conveyor, support fingers for receiving the arrested sheets from the table, dry wafer fingers located above the support fingers, means for feeding dry wafer sheets in succession to the dry wafer fingers, means for periodically opening the dry wafer fingers to allow dry wafer sheets to drop into the support fingers means for periodically opening the support fingers to allow wafer sheets supported thereby to fall therefrom, said fingers and table cooperating to form in front of the stop sandwiches comprising one or more superposed creamed wafer sheets and a single dry wafer sheet at the top, and means for periodically withdrawing the stop to allow the conveyor to feed the wafer sandwiches forward.

In a preferred embodiment of the invention, the machine comprises a main cam mechanism which, at each cycle of operation thereof, opens the support fingers and seeks to reciprocate the table and to withdraw the stop, the conveyor being arranged to feed one creamed wafer sheet into position against the stop at each cycle of operation of the main cam mechanism, and an indexing cam mechanism adjustably geared to the main cam mechanism and serving to control the response of the table and the stop to the main cam mechanism. The indexing cam mechanism also serves, at each cycle of operation thereof, to open the dry wafer fingers.

The machine is adjustable, by change in the gear ratio between the main and the indexing cam mechanisms, to permit of change of the make-up of the wafer sandwiches produced. The indexing cam mechanism performs one cycle of operation per $n$ cycles of operation of the main cam mechanism, wherein $n$ is the number of creamed wafers in the sandwich, and suppresses operation of the stop during the first $n-1$ cycles of operation of the main cam mechanism and suppresses operation of the table during the last cycle of operation of the main cam mechanism.

The gear ratio between a main cam shaft, carrying the main cam mechanism, and an indexing cam shaft, carrying the indexing cam mechanism, is 1/1 for a two-wafer sandwich, 1/2 for a three-wafer sandwich, 1/3 for a four-wafer sandwich and so on.

In the case of a two-wafer sandwich, a dry wafer sheet is fed to the dry wafer fingers at each cycle of operation of the main cam shaft, the table is prevented from operating and the stop is withdrawn at each cycle of the main cam shaft. A dry wafer sheet is deposited, by successive opening of the two sets of fingers, on each creamed wafer sheet arrested by the stop.

In the case of a three-wafer sandwich, dry wafer sheets are supplied to the dry wafer fingers at alternate cycles of the main cam shaft, the table is operative during the first cycle only of each pair of successive cycles and the stop is withdrawn during the second cycle of the pair.

Similarly, for a four-wafer sandwich, one dry wafer sheet is supplied to the dry wafer fingers for every three cycles of the main cam shaft, the table operates for the first two cycles only and the stop is not withdrawn until the third cycle.

Preferably registering fingers are provided, these being operated at each cycle of the main cam shaft to register the sheets held by the support fingers and/or on the conveyor in front of the stop.

Figure 2:
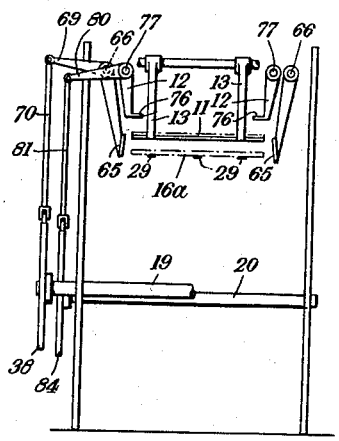
Figure 3:
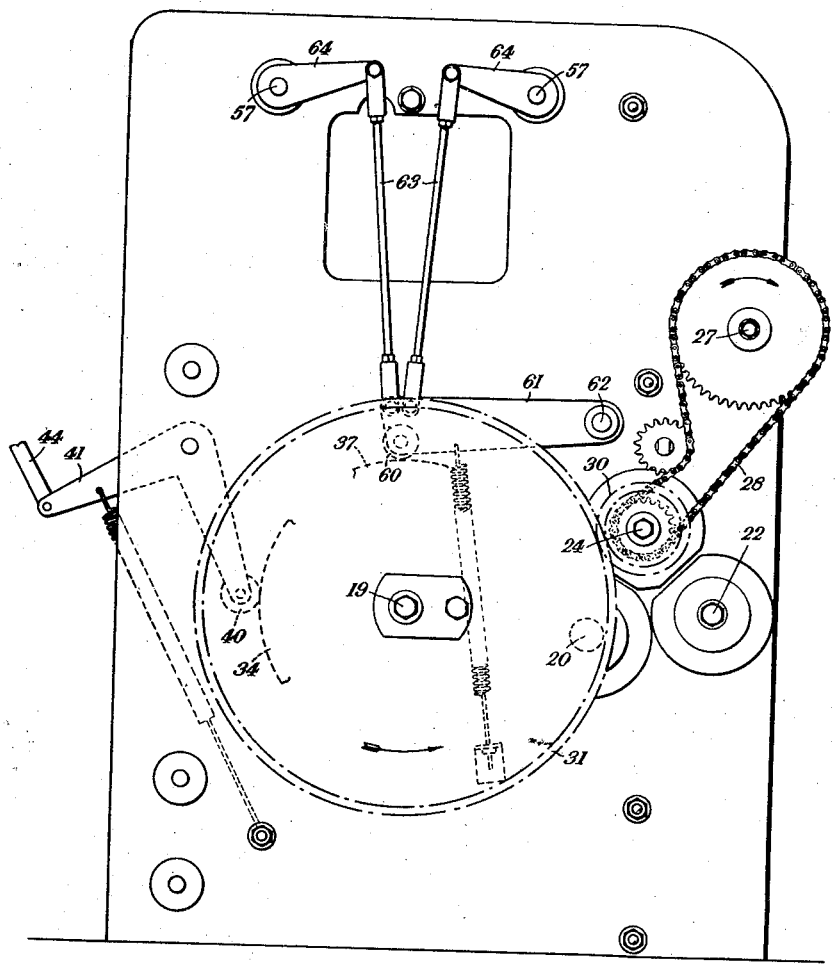
Figure 4:
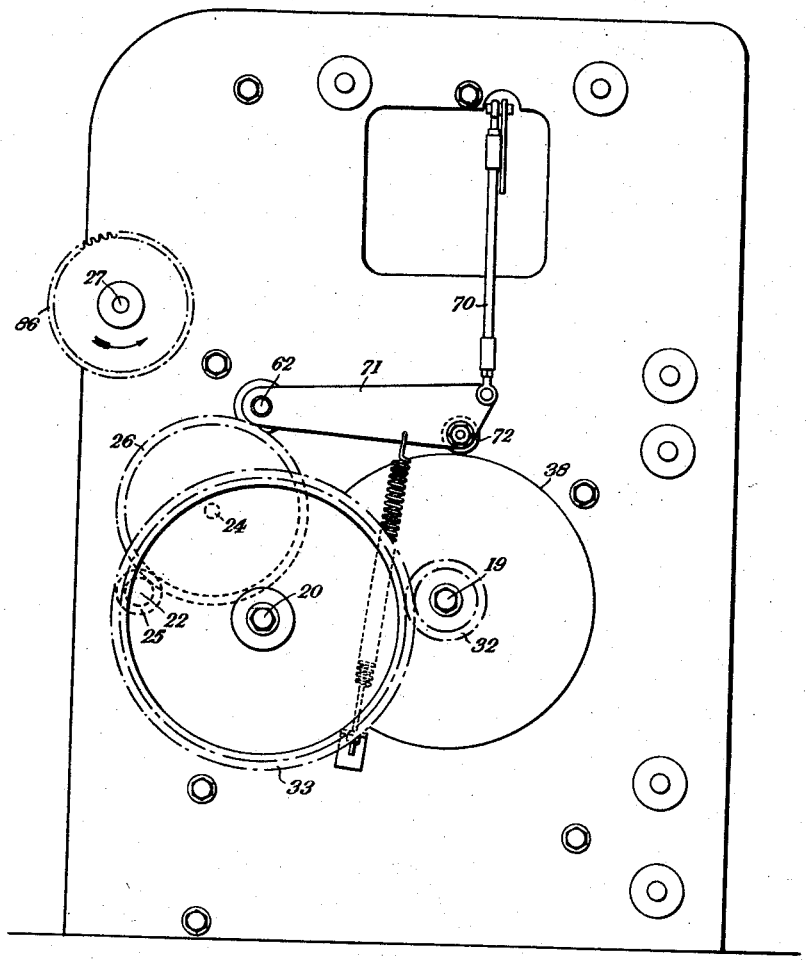
Figure 5:
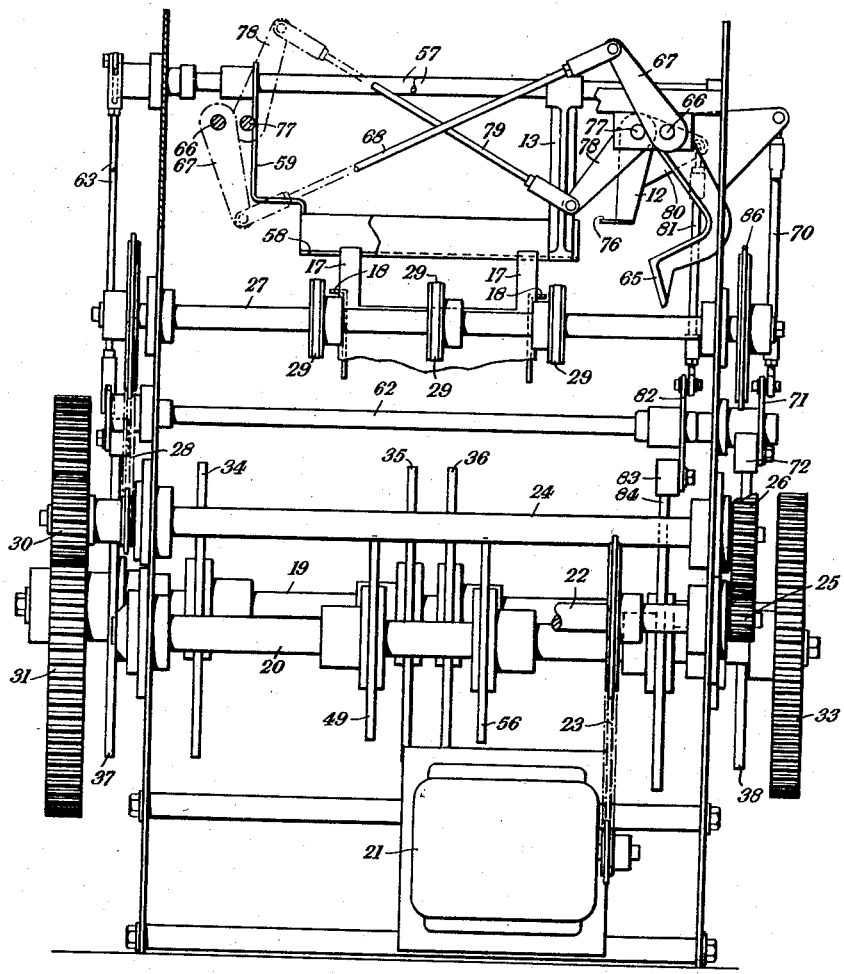
Figure 6:
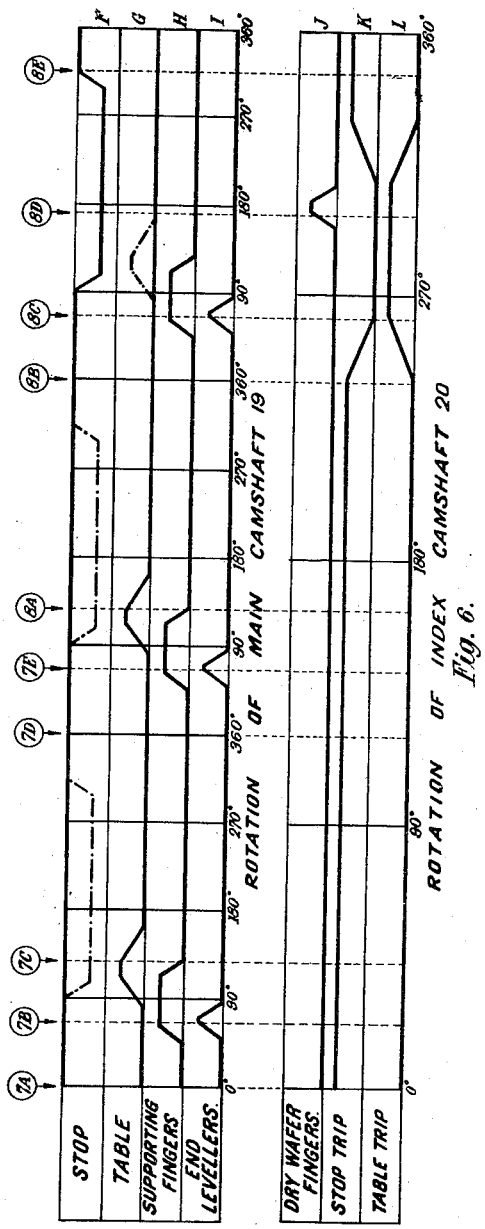

One specific embodiment of sandwiching machine according to the invention will now be described in detail, by way of example, with reference to the accompanying drawings, in which:

Fig. 1 is a diagrammatic longitudinal section through the machine,

Fig. 2 is a diagrammatic end elevation, looking from the left hand side of Fig. 1, Fig. 3 is a front elevation on a larger scale, Fig. 4 is a corresponding rear elevation, Fig. 5 is an end elevation, partly in section, looking from the right hand side of Fig. 3, certain parts being omitted for the sake of clarity, Fig. 6 is a diagram illustrating the operation of the cams on the main cam shaft and on the indexing cam shaft for a 4-wafer sandwich, and Figs. 7A–E and 8A–E are diagrams illustrating successive stages in the formation of a 4-wafer sandwich.

Like reference numerals indicate like parts throughout the figures.

The sandwiching machine illustrated is intended to form part of a plant for the automatic production of wafer sandwiches as described in U. S. application Serial No. 574,158, filed March 27, 1956. This plant comprises a selecting and marshalling unit, more fully described in U. S. application Serial No. 574,113, filed March 27, 1956, comprising a selecting conveyor, part of the downward run of which is seen at 10 in Fig. 1, for diverting every $m$th wafer sheet from a procession of wafer sheets fed forward continuously from a wafer baking machine, m being a small whole number exceeding unity. The sandwiching machine, as illustrated, is organised to make 4-wafer sandwiches, but it is adjustable, as later described, to produce sandwiches consisting of 2, 3, 5 or more wafers. The selecting and marshalling unit is similarly adjustable. The selecting conveyor 10 periodically feeds a dry wafer sheet 11 into position between dry wafer fingers 12. The dry wafer sheet 11 thereafter falls, as shown in Fig. 1, from the dry wafer fingers 12 into support fingers 13. The spacing of the remaining wafer sheets in the procession above referred to is rendered uniform by the marshalling unit and these wafer sheets are then passed through sandwiching machine and delivered, creamed surface upwards, by a conveyor 14 (Fig. 1) to the conveyor 15 of the spreading machine.

Figure 7:
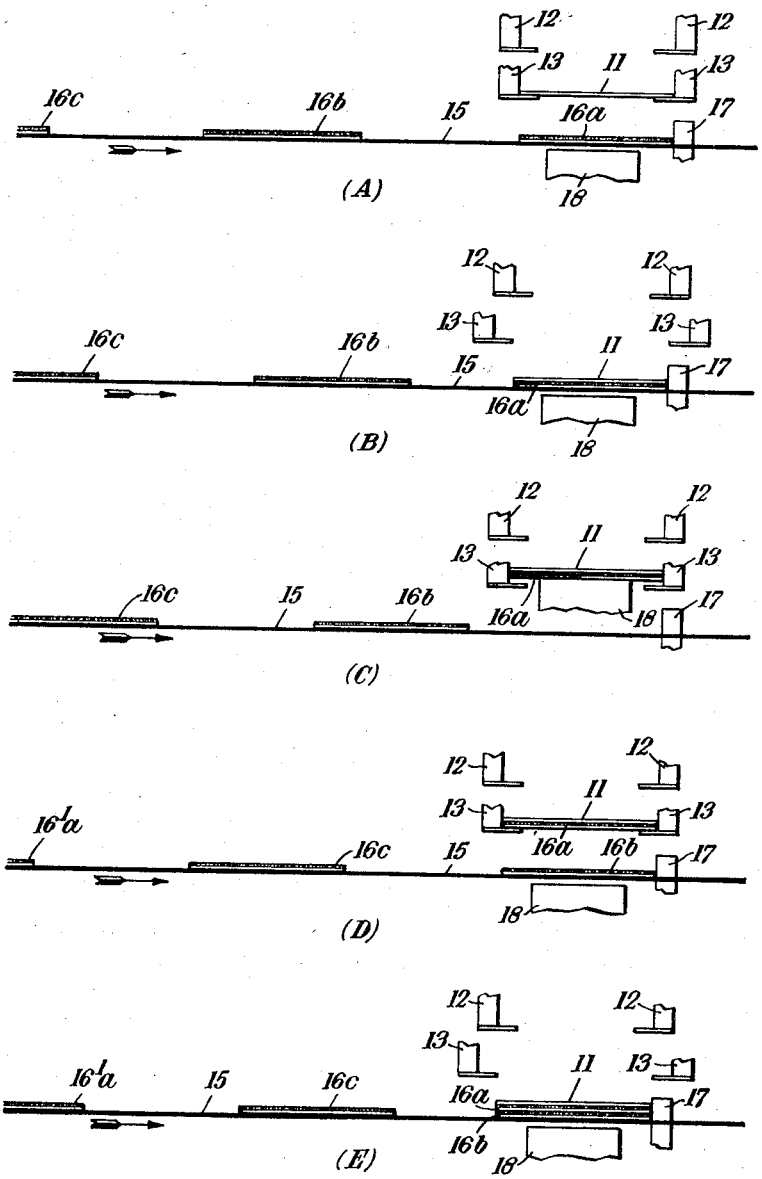
Figure 8:
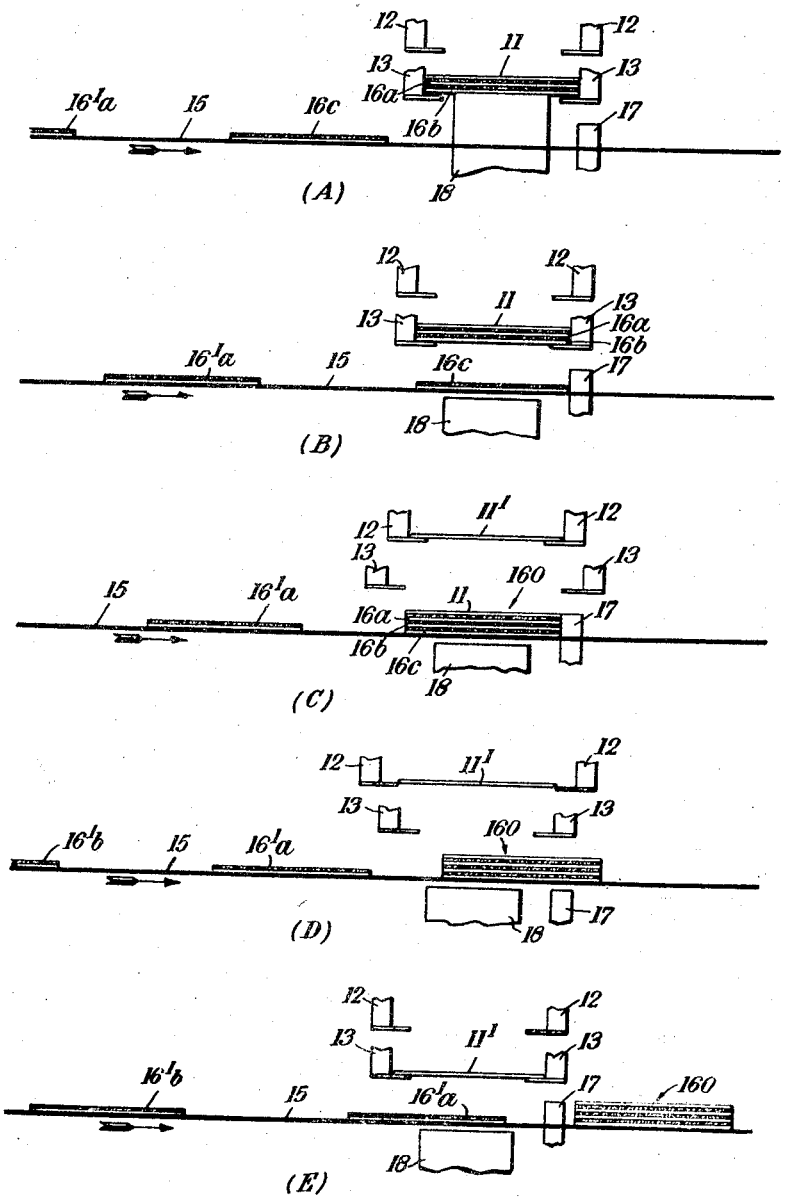

The general principle of operation of the machine will first be described with reference to Fig. 1 and Figs. 7 and 8. The machine includes a stop 17, against which the creamed wafer sheets are fed in succession by the conveyor 15. In Figs. 1 and 7A the first, 16a, of the creamed wafer sheets required to make up a sandwich is shown having arrived in position against the stop. At this time the dry wafer sheet 11 for this sandwich has dropped from the dry wafer fingers 12 into the support fingers 13. The support fingers 13 then open, as shown in Fig. 7B, to allow the wafer sheet 11 to drop on to the top of the wafer sheet 16a. A table 18 then rises to lift the superposed wafer sheets 11, 16a into the support fingers 13, which close to support these two sheets as seen in Fig. 7C. The table 18 then descends to allow the next creamed wafer sheet 16b to be fed into position against the stop 17, as shown in Fig. 7D. The support fingers 13 open again, to allow the wafer sheets 11, 16a to drop on to the top of the wafer sheet 16b (Fig. 7E). The table 18 rises again to lift the three superposed wafer sheets 11, 16a, 16b into the support fingers 13, which then close to support them (Fig. 8A). The table 18 then descends to allow the next creamed wafer sheet 16c to be fed to the stop 17 (Fig. 8B). The support fingers 13 then open, as shown in Fig. 8C, to allow the three wafer sheets 11, 16a, 16b to drop on to the top of the wafer sheet 16c to complete the formation of the 4-wafer sandwich block indicated at 160. At the same time the dry wafer sheet 11' for the next sandwich is fed into the dry wafer fingers 12 as shown. The stop 17 is then lowered, as shown in Fig. 8D, to allow the conveyor 15 to feed the sandwich block 160 forwards and the dry wafer fingers 12 open to drop the dry wafer sheet 11' into the support fingers 13. The stop 17 then returns (Fig. 8E) into position to intercept the first creamed wafer sheet 16'a for the next sandwich. This sequence of operations is repeated for each further 4-wafer sandwich produced by the machine.

The above-mentioned operations are controlled by a main cam shaft 19 and an index cam shaft 20. The machine is driven by an electric motor 21 (Fig. 5) which drives a shaft 22 through a chain and sprocket drive 23. The shaft 22 drives a shaft 24, through the agency of gears 25, 26. The shaft 24 drives a conveyor shaft 27 by a chain and sprocket drive 28 (see also Fig. 3). The conveyor 15, which is driven by the shaft 27, consists of three belts 29 (Figs. 2 and 5), the stop 17 and table 18 being bifurcated, as shown in Fig. 5, to permit them to move up and down in relation to the conveyor. The shaft 24 drives the main cam shaft 19 through gears 30, 31 (Figs. 3 and 5) and the main cam shaft 19 drives the index cam shaft 20 through gears 32, 33 (Fig. 4).

The main cam shaft 19 requires to be driven at different speeds according to the make-up of the sandwich, i. e. (assuming an initial production of 20 wafer sheets per minute) at 10 R. P. M. for a 2-wafer sandwich, at 13⅓ R. P. M. for a 3-wafer sandwich, at 15 R. P. M. for a 4-wafer sandwich and at 16 R. P. M. for a 5-wafer sandwich. Adjustment of the speed of the cam shaft 19 to suit changes in the make-up of the sandwich is effected by changing the gears 25, 26 by which the shaft 24 is driven, and this change makes a corresponding adjustment in the speed of the conveyor shaft 27.

The gear ratio between the main cam shaft 19 and the index cam shaft 20 also needs to be varied in accordance with the make-up of the sandwich. This gear ratio is 1/1 for a 2-wafer sandwich, 1/2 for a 3-wafer sandwich, 1/3 for a 4-wafer sandwich and so on. This change is made by changing the gears 32, 33.

The main cam shaft 19 carries five cams 34, 35, 36, 37, 38 (Fig. 5). The cam 34 actuates a metering gate 39 (Fig. 1) through the agency of a follower 40 carried on a bell crank 41, pivoted at 42 and coupled to the gate 39 by a link 44. The purpose of the gate 39 is to ensure that the creamed wafer sheets 16 arrive at the stop 17 at the correct time in relation to the rise of the table 18. The gate 39 is raised once per revolution of the main cam shaft 19 to intercept each creamed wafer sheet on its way to the stop and is then withdrawn, as shown in Fig. 1, to allow the intercepted sheet to move on to the stop.

The cam 35 serves to actuate the stop 17. It coacts with a follower 45 (Fig. 1) on the lever 43, which is also pivoted at 42 and is coupled to the stop 17 by a pin 46. In the case of a 4-wafer sandwich, during the first two cycles of operation of the main cam shaft 19 the stop 17 is prevented from descending, when the low portion of the cam 35 reaches the follower 45, by a trip member 47. This trip member carries a follower 48 cooperating with a cam 49 on the index cam shaft 20 (see also Fig. 5). During the third cycle of the main cam shaft 19 the cam 49 moves the trip member 47 aside to allow the stop 17 to descend, when permitted to do so by the cam 35. The action of the stop is shown at F in Fig. 6, the downward movement of the stop being suppressed during the first two cycles of the main cam shaft 19 as indicated by chain-dotted lines, but permitted during the third cycle, as shown in full lines. The timing of the operation of the trip member 47 is shown at K in Fig. 6.

The cam 36 serves to actuate the table 18. It coacts with a follower 50 (Fig. 1) on a lever 51, pivoted at 151 and coupled by a pin 52 to the table 18. During the first two cycles of the main cam shaft 19, a spring 53 is able to lift the table 18 when the follower 50 runs on to the low portion of the cam 36 as indicated in full lines at G in Fig. 6. During the third cycle, however, a trip member 54, carrying a follower 55 coacting with a cam 56 (Fig. 5) on the index cam shaft 20, is moved into position to prevent the lever 51 from lifting the table 18 as indicated in chain-dotted lines at G in Fig. 6. The timing of the operation of the trip member 54 is shown at L in Fig. 6.

The cam 37 serves to actuate the support fingers 13. There are two such fingers at each side of the machine, the fingers 13 of each pair being fixed to a rod 57 journalled in the machine framework and connected by a ledge 58 on which the ends of the wafer sheets rest, as indicated in Fig. 1, when supported by the fingers. The cam 37 coacts with a follower 60 (Fig. 3) on a lever 61, pivoted on a rod 62 and connected, by links 63, to arms 64 fixed to the rods 57. The timing of the opening of the support fingers 13 is indicated at H in Fig. 6.

The cam 38 serves to actuate a pair of end levellers 65 which periodically register, in a direction transverse to the run of the conveyor 15, the wafer sheets resting on the conveyor against the stop 17. The end levellers 65 are attached to rods 66, journalled in the machine framework and coupled together by a linkage consisting of arms 67 (Fig. 5) fixed to the rods and a link 68 connecting the arms 67. An arm 69 (Fig. 2), fixed to one of the rods 66, is coupled by a link 70 (Fig. 4) to a lever 71, pivoted on the rod 62 and carrying a follower 72 coacting with the cam 38. The timing of the movement of the end levellers is indicated at I in Fig. 6. As there shown, the support fingers 13 are open at the time that the end levellers operate. The end levellers may, as an alternative, operate to register the wafer sheets while they are supported by the fingers 13.

The dry wafer sheets are guided into the dry wafer fingers 12 by means of a band conveyor 73 (Fig. 1) which extends beyond the terminal sprockets 74 of the selecting conveyor 10 and over a nose piece 75. It may be more convenient to arrange for the conveyor 73 to deliver the dry wafer sheets to the fingers 12 at a level below the left hand shaft 57, e. g. in a horizontal direction, and to permit of this the support fingers 13 at the side of the machine nearer the conveyor 73 are cranked, as shown at 59 in Fig. 5. Two dry wafer fingers 12 are provided at the front of the machine and two at the back, each pair of fingers being joined by a ledge 76 for supporting the side of the dry wafer sheets and being fixed to a rod 77, journalled in the machine framework and extending at right angles to the rods 57. The rods 77 are joined together by a linkage consisting of arms 78 (Fig. 5) fixed to the rods and joined by a link 79. One of the rods 77 carries an arm 80, coupled by a link 81 to a lever 82, pivoted on the rod 62 and carrying a follower 83 coating with a cam 84 on the index cam shaft 20. The timing of the opening of the dry wafer fingers 12 is indicated at J in Fig. 6. It may here be noted that the dry wafer fingers 12 are shown, for clarity, in Figs. 7 and 8, as moving in the same direction as the support fingers 13 whereas in fact, as shown in Figs. 1 and 5, they move in a direction at right angles to that in which the support fingers 13 move.

The sandwich blocks, after passing the stop 17, travel on to a belt 85 (Fig. 1) driven from a sprocket 86 (Fig. 4) on the shaft 27 (Fig. 3) by a chain drive (not shown). As the sandwich blocks travel along the belt 85, they are subjected to pressure by an upper belt 87 urged downwardly by springs 88. The sandwich blocks then pass on to a further conveyor 89 which carries them to a cutting machine.

In Fig. 6 the legends 7A, 7B, . . . 8A, 8B . . . indicate the relationship between the positions of the two cam shafts and the positions of the members actuated thereby as shown in the corresponding views in Figs. 7 and 8. As already explained, the machine is illustrated as organized for producing 4-wafer sandwiches, the main cam shaft 19 making three revolutions per revolution of the index cam shaft 20.

If it is desired to make 2-wafer sandwiches, the gear ratio is altered to 1:1, with the result that the trip member 54 is effective to prevent movement of the table 18 at every cycle of the main cam shaft 19 and the trip member 47 is rendered inoperative at every cycle of the main cam shaft, so allowing the stop 17 to be moved down at every cycle of the main cam shaft. The stop 17 is thus moved down shortly after position 7B in Fig. 6, allowing a 2-wafer sandwich, as shown in Fig. 7B, to move on out of the machine. In this case the dry wafer fingers 12 are opened during each cycle of the main cam shaft.

In the case of a 3-wafer sandwich, the index cam shaft 20 is arranged to make one revolution for every two revolutions of the main cam shaft 19. Consequently, the table 18 is free to move up during the first cycle of the main cam shaft but is blocked by the trip member 54 during the second cycle, while the stop 17 is freed for downward movement during the second cycle and shortly after position 7E in Fig. 6, allowing a 3-wafer sandwich, as shown in Fig. 7E, to move on out of the machine. In this case, the dry wafer fingers 12 will be opened during each second cycle of the main cam shaft.

As will readily be appreciated, the machine can be organized to produce sandwiches consisting of 5, 6 or more sandwiches by adjusting the gear ratio of the two cam shafts so that the index cam shaft performs one revolution for every 4, 6 . . . etc. revolutions of the main cam shaft.

Although the machine has been illustrated as provided with its own driving motor 21 it may instead, to ensure synchronisation of a complete wafer sandwich making plant, be driven from any other desired component of the complete plant.

In conclusion, it should be mentioned that the machine according to the invention is capable of making sandwiches from other thin flat articles besides wafer sheets and may, of course, be fed with wafer sheets coated with other substances besides cream, for example caramel, chocolate or jam.

Although the machine according to the invention can, as described in U. S. application Serial No. 574,158, filed March 27, 1956, be used to make sandwiches from creamed sandwiches with interposed layers of caramel or the like. In this case, the dry wafer fingers will be supplied with creamed sandwiches having no surface coating and a procession of creamed sandwiches, coated with caramel on their upper surfaces, will be fed to the stop.

What I claim as my invention and desire to secure by Letters Patent is:

1. A machine for producing wafer sandwiches comprising a conveyor for feeding creamed wafer sheets, with their creamed surfaces uppermost, successively into position against a stop, means for periodically lifting arrested wafer sheets from the conveyor and afterwards allowing the lifted wafer sheets to descend into position on top of another arrested wafer sheet, thereby forming a sandwich of superposed creamed wafer sheets in front of the stop, mechanism for incorporating at the top of each sandwich a single dry wafer sheet, and means for periodically withdrawing the stop to permit the conveyor to feed completed wafer sandwiches forward.

2. A machine for producing wafer sandwiches, each consisting of a dry wafer sheet on top of $n$ creamed wafer sheets, $n$ being a small whole number, comprising a conveyor for feeding creamed wafer sheets, with their creamed surfaces uppermost, successively into position against a stop, a reciprocating table for periodically lifting the arrested wafer sheets from the conveyor and into the grip of support fingers, the table performing $n-1$ strokes per sandwich, means for periodically opening the support fingers to allow wafer sheets held thereby to fall on top of a wafer sheet arrested by the stop, means for introducing into the support fingers a single dry wafer sheet for incorporation in each sandwich, and means operating whenever a completed wafer sandwich has been formed to withdraw the stop and allow the conveyor to feed the wafer sandwich forward.

3. A machine for producing wafer sandwiches, comprising a conveyor for feeding creamed wafer sheets, with their creamed surfaces uppermost, into position against a stop, a reciprocating table for periodically lifting the arrested wafer sheets from the conveyor, support fingers for receiving the arrested sheets from the table, dry wafer fingers located above the support fingers, means for feeding dry wafer sheets in succession to the dry wafer fingers, means for periodically opening the dry wafer fingers to allow dry wafer sheets to drop into the support fingers, means for periodically opening the support fingers to allow wafer sheets supported thereby to fall therefrom, said fingers and table cooperating to form in front of the stop sandwiches comprising one or more superposed creamed wafer sheets and a single dry wafer sheet at the top, and means for periodically withdrawing the stop to allow the conveyor to feed the wafer sandwiches forward.

4. A machine according to claim 2, comprising a main cam mechanism which, at each cycle of operation thereof, opens the support fingers and seeks to reciprocate the table and to withdraw the stop, the conveyor being arranged to feed one creamed wafer sheet into position against the stop, at each cycle of operation of the main cam mechanism, and an indexing cam mechanism adjustably geared to the main cam mechanism and serving to control the response of the table and the stop to the main cam mechanism.

5. A machine according to claim 4, wherein the indexing cam mechanism serves, at each cycle of operation thereof, to open the dry wafer fingers.

6. A machine according to claim 4, wherein the indexing cam mechanism is arranged to perform one cycle of operation per $n$ cycles of operation of the main cam mechanism, wherein $n$ is the number of creamed wafers in the sandwich, and to suppress operation of the stop during the first $n-1$ cycles of operation of the main cam mechanism and to suppress operation of the table during the last cycle of operation of the main cam mechanism.

7. A machine according to claim 6, in which the indexing cam mechanism comprises separate cams controlling trip members which are alternatively effective to suppress operation of the table and of the stop.

8. A machine according to claim 4, which includes registering fingers actuated by the main cam mechanism, at each cycle of operation thereof, to register the wafer sheets held by the support fingers.

9. A machine according to claim 4, which includes a metering gate for arresting the wafer sheets on the conveyor as they approach the stop, said gate being withdrawn by the main cam mechanism, at each cycle of operation thereof, to permit a wafer sheet to pass on to the stop.

10. A machine according to claim 1, comprising mechanism for subjecting to pressure the wafer sandwiches leaving the machine.

11. A machine according to claim 10, in which the pressing mechanism comprises a spring loaded belt for applying pressure to the tops of the wafer sandwiches.

References Cited in the file of this patent

UNITED STATES PATENTS

| | | |
|---|---|---|
| 1,582,820 | Hungerford | Apr. 27, 1926 |
| 1,649,563 | Boettcher | Nov. 15, 1927 |
| 1,973,195 | Ankcorn | Sept. 11, 1934 |
| 2,715,878 | Egerton | Aug. 23, 1955 |